June 7, 1966  R. J. MAHAFFEY  3,254,915
CAR SEAT
Filed March 3, 1965  2 Sheets-Sheet 1
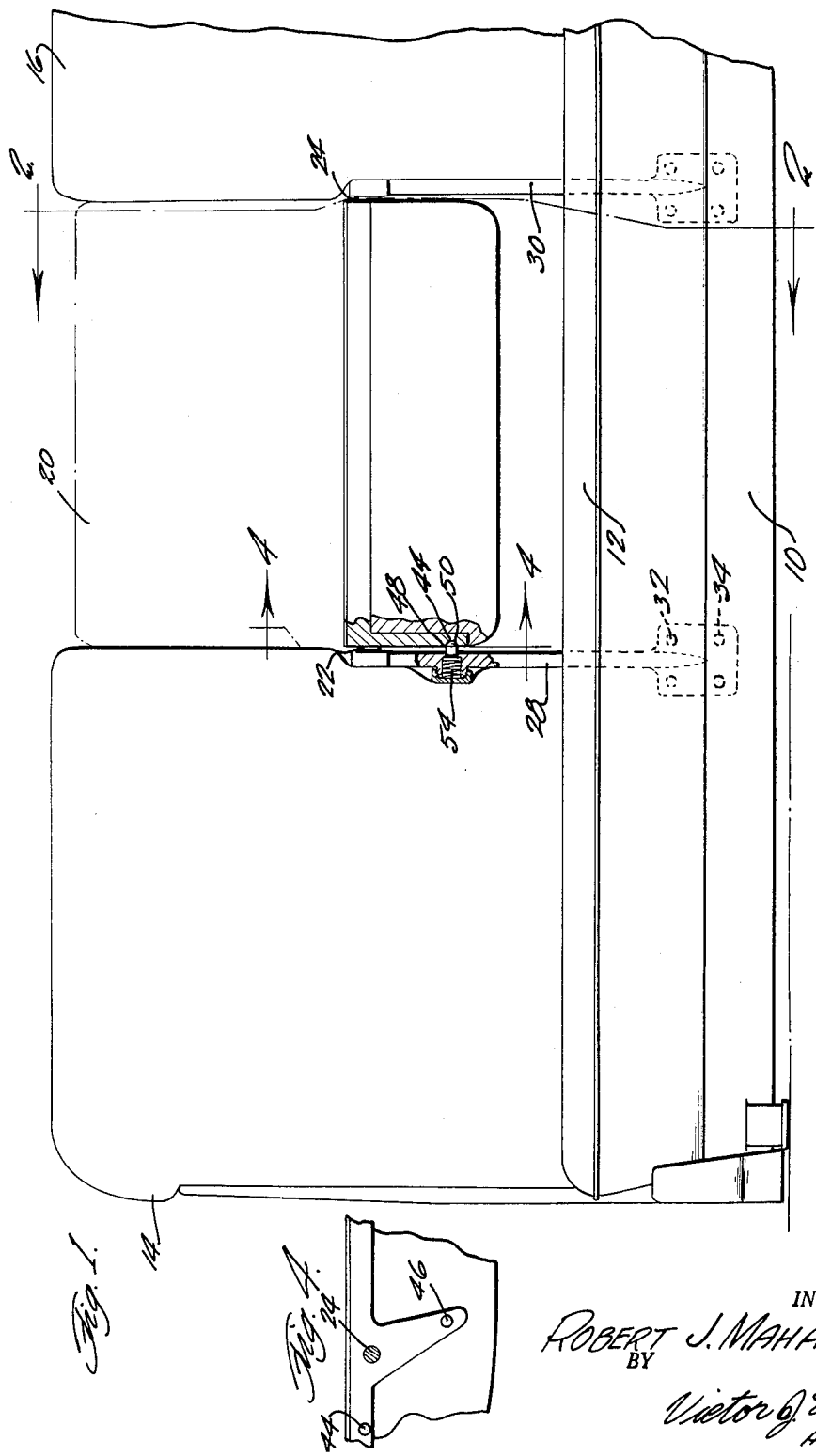
INVENTOR.
ROBERT J. MAHAFFEY
BY
Victor J. Evans & Co.
Attorneys

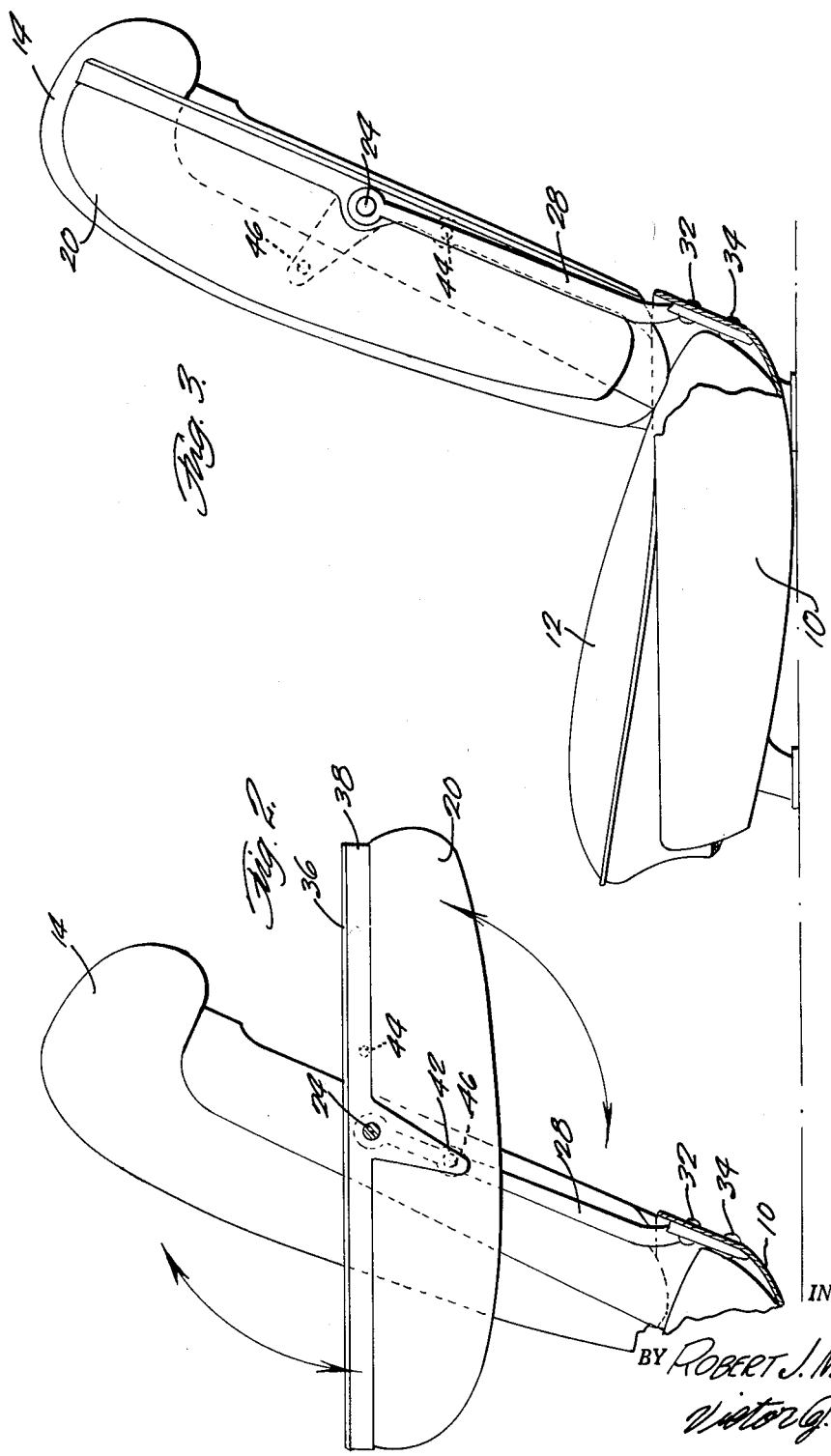

United States Patent Office 3,254,915
Patented June 7, 1966

3,254,915
CAR SEAT
Robert J. Mahaffey, P.O. Box 212, Ruston, La.
Filed Mar. 3, 1965, Ser. No. 436,856
4 Claims. (Cl. 297—125)

The present invention relates to an improved car seat and table top assembly that is pivotally mounted and disposed between back rests for an automobile seat, and more particularly the invention relates to an improved mounting construction for providing a pivotally mounted back rest that may also be used as a table top if it is pivotally disposed about its axis into a substantially horizontal position, and for providing a Formica or other finished surface means upon said horizontal surface.

It is therefore an object of the present invention to provide an improved and combined cushion and table top construction for use in an automobile assembly so that it may be readily disposed into use, whether the assembly is to be used as a conventional back rest when it is in a generally upright or upwardly disposed position, or when it is in a generally horizontal position so that the back portion of the cushion may be constructed to provide a table top surface.

The above and other objects and advantages of the invention will become apparent upon full consideration of the following detailed description and accompanying drawings in which:

FIGURE 1 is a substantially front elevational view, a portion only thereof being shown in broken away, cross-sectional view, and showing the embodiment of the invention that is preferred;

FIGURE 2 shows a cross-sectional view taken along lines 2—2 of FIGURE 1 in which the back rest is shown in a horizontally disposed position after having been turned in the manner shown by the arrows so that the pivotally mounted back rest may be adapted for use as a conventional table top;

FIGURE 3 shows a side elevational view in which the pivotally mounted back rest is disposed in a generally upright position and is held in place by a catch means for being used as a back rest; and FIGURE 4 shows a cross-sectional view taken along lines 4—4 of FIGURE 1, and shows in detail the catch mechanism.

Referring now to the drawings, there is shown a frame 10 on which is mounted an upholstered seat 12 extending from one end to the other of said frame 10, and upon which are mounted at each end of the frame and seat assembly 10, 12, a back rest 14 and a back rest 16. There is a space disposed between the back rests 14, 16, wherein there is mounted a pivotally mounted back rest 20 which is mounted on pivots 22, 24.

The pivots 22, 24 are mounted on a frame element 28, 30, so that the upholstered pivotally mounted back rest 20 may be securely mounted and positioned between the back rests 14, 16. The frame element 28 is supported from the frame 10 as shown by rivet or fastening means 32, 34, in FIGURES 2 and 3.

On the pivotally mounted back rest 20 there is an upholstered side which is shown in FIGURE 3 as being disposed forward of the pivots 24 and the frame 28; while in FIGURE 2 the upper surface of the pivotally mounted back rest 20 is shown as being provided with a hard plastic finished table top 36, which is provided with a peripherally mounted molding strip 38.

There is provided in and about the pivot means 24 a catch mechanism 42 which includes and cooperates with a recess 44 and a recess 46, as shown in FIGURES 2 and 3. The recess is adapted to receive a ball or cylindrical sliding or latching element 48 which may have a rounded nose or nub 50 that it may slidably engage and be disengaged similarly from the recesses 44, 46, respectively. The latch 48 is biased into any given recess by a spring mechanism 54, as shown, and in this way the latch mechanism 48 is generally distended from the frame 28, and is thus adapted to be received and slide into the recesses 44, 46 when they are disposed proximate to the position adjacent the frame member 28.

Additional embodiments of the invention in this specification will occur to others and therefore it is intended that the scope of the invention be limited only by the appended claims and not by the embodiment described hereinabove. Accordingly, reference is made to the following claims in determing the full scope of the invention.

What is claimed is:

1. A combined cushion and table assembly for an automobile comprising a frame for mounting a vehicle seat, a back rest for a seat position at each end of said frame, a pivotally mounted back rest for a seat position intermediate said other back rests in pivotal relation thereto, the front side of said pivotal back rest being upholstered, the rear side of said pivotal back rest having a table top surface disposed thereon having pivots centrally disposed and mounted adjacent to the top and between the ends of the table top surface including a hard plastic surface and mounting strips about the periphery thereof, a frame member mounted from said frame having ends for supporting said pivots, and a catch mechanism to retain said pivotally mounted back rest in either a back rest position or in a table top position.

2. A combined cushion and table assembly for an automobile comprising the invention according to claim 1 wherein said catch mechanism is positioned proximate to the pivotal mechanism of said pivotally mounted back rest, and includes a recess in said pivotally mounted back rest for each given position and a ball and spring element device for extending into the recess when performing the function of a catch mechanism.

3. A combined cushion and table assembly for an automobile comprising a frame for mounting a vehicle seat, a back rest for a seat position disposed at each end of said frame, a pivotally mounted back rest for a seat position intermediate said other back rests in pivotal relation thereto, the front side of said pivotal back rest being upholstered, the rear side of said pivotal back rest having a table top having pivots centrally disposed and mounted adjacent to the top and between the ends of the table top surface, and a finished surface disposed upon said table top being retained in place by mounting strips disposed about the periphery thereof, and a frame member mounted from said frame having ends for supporting said pivots.

4. The invention according to claim 3 wherein a catch mechanism is provided to retain the back rest in either of two positions so that the pivotally mounted back rest may be disposed substantially parallel with the back rests secured to said seat positions, and the catch mechanism may also provide for retaining the table top surface in a substantially horizontal position, as desired.

References Cited by the Examiner
UNITED STATES PATENTS

| | | | |
|---|---|---|---|
| 2,240,748 | 5/1941 | Bak | 297—113 X |
| 2,879,835 | 3/1959 | Miller | 297—194 X |
| 2,942,649 | 6/1960 | Wells | 297—125 |
| 3,094,354 | 6/1963 | Bernier | 297—112 |
| 3,103,630 | 9/1963 | Pitts et al. | 297—113 X |

FRANK B. SHERRY, *Primary Examiner.*

J. T. McCALL, *Assistant Examiner.*